United States Patent [19]

Cooper et al.

[11] 4,143,904

[45] Mar. 13, 1979

[54] STATION WAGON TAILGATE

[75] Inventors: Norman F. Cooper, Mt. Clemens; David N. Lee, Almont, both of Mich.

[73] Assignee: General Motors Corporation, Detroit, Mich.

[21] Appl. No.: 881,634

[22] Filed: Feb. 27, 1978

[51] Int. Cl.[2] .................. B62D 25/08

[52] U.S. Cl. .................. 296/57 A; 49/386

[58] Field of Search .................. 296/57 R, 57 A, 106, 296/50, 56; 49/386; 16/75

[56] References Cited

U.S. PATENT DOCUMENTS

| | | | |
|---|---|---|---|
| 2,984,517 | 5/1961 | Farrow | 296/57 |
| 3,031,225 | 4/1962 | Saffer | 296/57 R |
| 3,336,070 | 8/1967 | Jackson | 296/57 |

*Primary Examiner*—Joseph F. Peters, Jr.
*Assistant Examiner*—John A. Carroll
*Attorney, Agent, or Firm*—K. H. Mac Lean, Jr.

[57] ABSTRACT

A vehicle tailgate of the type which is hinged along a bottom edge for pivotal movement about a horizontal axis. Specifically, the invention concerns a torque rod type counterbalancing spring for the tailgate which exerts both an outward opening bias on the tailgate and a lifting or closing force on the tailgate opposing opening movement so as to counterbalance gravitational forces thereon. The torque rod is mounted and connected so that the rod is continuously stressed in a torsional manner in only one direction from opening to closing, there being no null point where there is a reversal of strcss on the torque rod.

3 Claims, 6 Drawing Figures

STATION WAGON TAILGATE

This invention relates to station wagon type tailgates and, more particularly, to a torsion rod spring and for counterbalancing the tailgate which is stressed one direction continuously between closed and open positions, there being gate position in which the stress on the torque rod is reversed or is unstressed.

Prior art counterbalancing springs for tailgates of the torsion rod type are known. Specifically, U.S. Pat. Nos. 2,984,517 to Farrow and 3,336,070 to Jackson are considered relevant. Both the Jackson and the Farrow patents utilize torsion rods to counterbalance the weight of a tailgate as it pivots about its bottom edge. Both patents disclose a torsion rod with one end fixed to the tailgate and an opposite end acting as a crank portion and attached to the vehicle body. Unlike the subject invention, both patents disclose springs which pass through an unstressed operative mode as the tailgate moves between opening and closing. In other words, the rod is first stressed in one direction and then in another. This alternate stressing of the rod in opposite directions is detrimental to the life and consistency of torsion rod type springs. Resultantly, the utility as reflected in endurance and useful life is diminshed.

The subject torsion rod counterbalancing spring for tailgates involves a mounting arrangement for the torsion rod which provides both an initial opening or kick-out force as the tailgate is opened and an opposite closing or counterbalance force as the tailgate is moved to its lowered position. While both the Jackson and the Farrow arrangements provide the kick-out and the counterbalancing function, they subject the torsion rods to opposite stressing and passage through a no-stress mode of operation.

The subject invention provides a torsion rod type counterbalanced spring which both provides a kick-out force on the tailgate and an opposite counterbalancing force as the tailgate is lowered to its horizontal open position. Unlike the Farrow and Jackson arrangements, the torsion rod is constantly stressed in only one direction between opening and closing of the tailgate. The torsion rod therefore does not pass through a null or unstressed mode.

The crank arm end portion of the subject torsion rod is mounted for movement in a slotted aperture provided in a link member. The link member is pivotally mounted to the vehicle body. As the tailgate pivots from a horizontally disposed open position, the end of the crank arm pivots in the upper end of the link arm which pivots about its mounting axis. During this mode of operation the link arm moves closer to both the vehicle body and the tailgate, which itself is pivoted closer to the vehicle body. This provides an upward lifting force on the tailgate. Simultaneously, the link arm pivots from its initial and almost horizontal orientation to a more vertical orientation. When the tailgate itself nears a vertical orientation with the center of gravity about over the hinging axis, a contact pad or shoe fulcrum on the tailgate engages an arcuate surface on the link member. This provides a fulcrum or bearing point intermediate between the link arm's pivotal attachment to the vehicle body and the upper end of the slotted aperture in the link arm. When this intermediate bearing point or fulcrum engages the tailgate as it moves from a nearly vertical position toward its closed position, an outward or kick-out force is imposed on the tailgate. Thereby, when the tailgate is unlatched from a closed position, an outward kickout force is produced on the tailgate by the forces of the torsion rod on one end of the link member and the force of the link member on the intermediate bearing point or fulcrum.

Therefore, it is understood that an object of the subject invention is to provide a torsion rod type spring for a vehicle tailgate providing an initial kick-out force on the tailgate immediately after opening and subsequently an opposite counterbalancing force as it is moved to its fully open position without a reversal of stresses in the torsion rod and thus without its passage through an unstressed mode of operation.

A further object of the present invention is to provide a torsion rod type kick-out and counterbalance spring for a vehicle tailgate mounted in a manner so that the torsion rod is continuously stressed in only one direction during movement of the tailgate between fully closed and fully open positions, thereby avoiding an unstressed spring mode and a reversal of stresses in the spring.

A still further object of the present invention is to provide a kick-out and counterbalance spring of the torsion rod type for a tailgate, the torsion rod having a crank arm residing in an elongated slot of a pivotal link member so that movement of the tailgate causes winding and unwinding of the torsion rod and pivotal movement of the link arm and a bearing pad or portion of the tailgate adapted to engage the link arm near the end of the closing mode of operation thereby providing an intermediate fulcrum point between the link member's attachment to the body and the engagement of the crank arm with the torsion rod.

Further objects and advantages of the subject invention will be more readily apparent from a reading of the following detailed description, reference being had to the accompanying drawings in which a preferred embodiment is illustrated.

IN THE DRAWINGS

Figure 1:
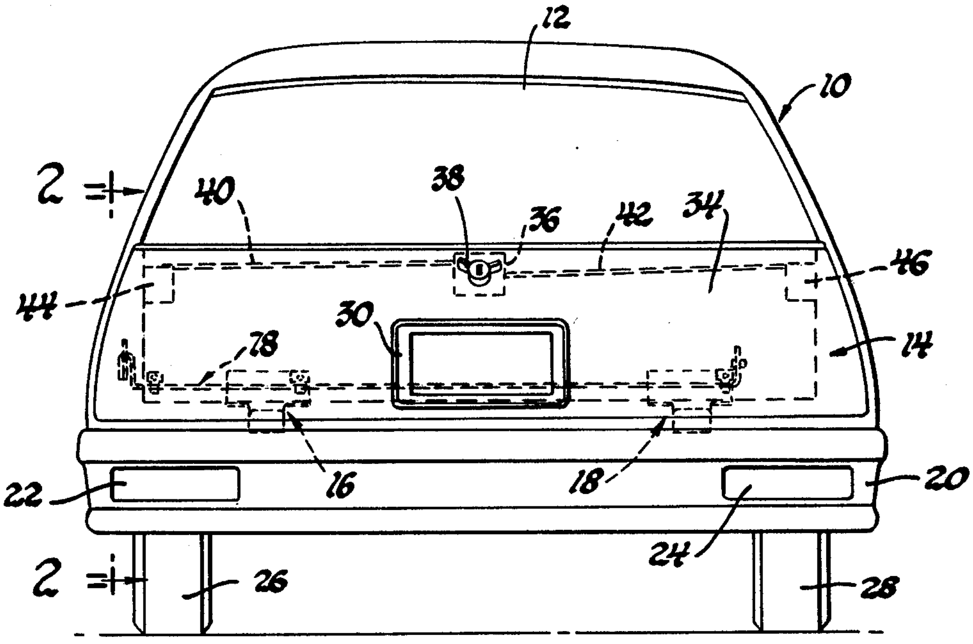
FIG. 1 is a rear end view of a station wagon type vehicle having a tailgate and the subject torsion rod counterbalance spring.

In FIG. 1, the back end of a vehicle 10 is illustrated. Vehicle 10 is a station wagon type having a tailgate, including an upper view or glass portion 12. Portion 12 is pivoted along its upper edge between closed and open positions. A lower gate portion 14 is provided which is hinged about a lower edge by hinge assemblies 16, 18 (see FIG. 4) so that when opened, the upper edge of gate 14 moves outward from the body and then downward about the substantially horizontal axis through hinges 16, 18. The vehicle 10 includes a rear bumber member 20 having openings therein for stop lights 22 and 24. The vehicle is supported on four wheels but only the two rear wheels 26, 28 are visible in FIG. 1. A recessed portion 30 in the outer panel of gate 14 is intended for mounting a license plate. Within the gate portion 14 between inner and outer panels 32, 34 (see FIGS. 2, 3) is located a control assembly for latching and unlatching the gate 14. The control assembly includes a central mechanism 36 which is controlled by a winged and keyed actuator 38. The central mechanism is connected by rod actuators 40, 42 to left and right latching assemblies 44, 46. For more details of the control assembly 36, reference is made to a co-pending application filed Nov. 23, 1977, and to the 1978 Chevrolet Malibu station wagon.

Figure 2:
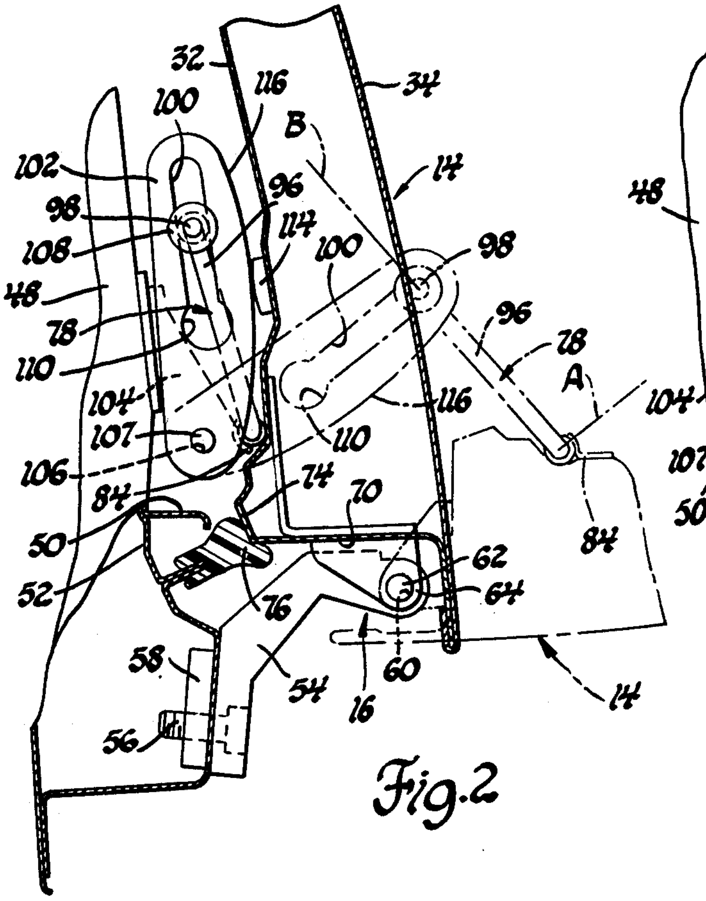
FIG. 2 is a greatly enlarged and sectioned view of the tailgate in a closed position taken along section line 2—2 in FIG. 1 and looking in the direction of the arrows.

In FIG. 2, the sectioned view of tailgate 14 is illustrated in relation to vehicle body 48 which forms the opening to the interior. Specifically, vehicle body 48 includes a framing portion 50 for the rear opening adjacent and connected to body portions 52. The body portions 52 support a fixed hinge bracket 54 for the tailgate 14. The hinge 54 is attached at a lower end to portions 52 by fasteners 56. A backup stiffener 58 is utilized as shown in FIG. 2, to provide a rigid support for the hinge and tailgate. The member 54 has a rearwardly extending portion with a bore or aperture 60 therethrough having a horizontal axis. The bore 60 receives a pin or other type fastener 62 which also extends through an aligned aperture in a bracket portion 64 attached to the tailgate 14. Specifically, the bracket 64 is attached to the bottom wall 70 of the tailgate.

Normally, as shown in FIG. 2, the bottom wall 70 of tailgate 14 is an integral part of the inner wall 32 and is attached to an outer and lower end to outer panel 34 by a spun or folded over portion 72 thereof. By this means, the tailgate 14 is permitted to pivot about the axis of hinge pins 62 between the closed position shown by solid lines in FIG. 2 and the open position shown by phantom lines in FIG. 2. When in the closed position, the inside corner 74 of the panel 32 engages a seal member or weather strip 76. Specifically, member 76 is of elastomeric material.

Figure 4:
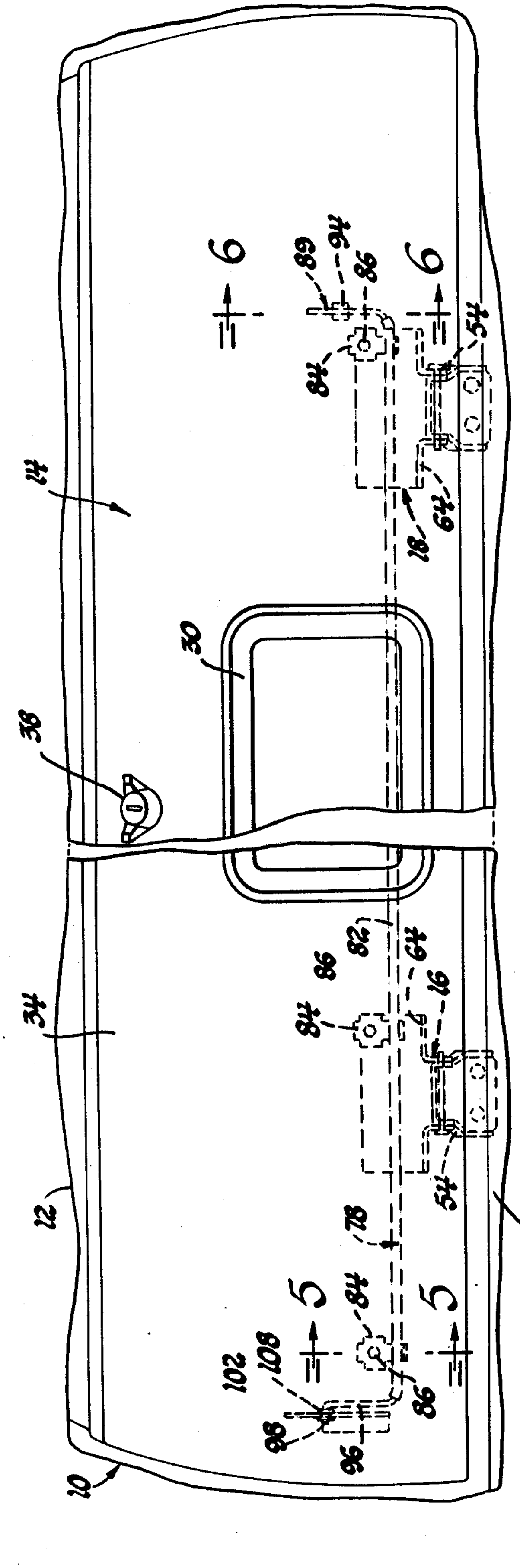
FIG. 4 is an enlarged view similar to FIG. 1 but showing details of the subject torsion rod spring and tailgate attachment.
Figure 5:
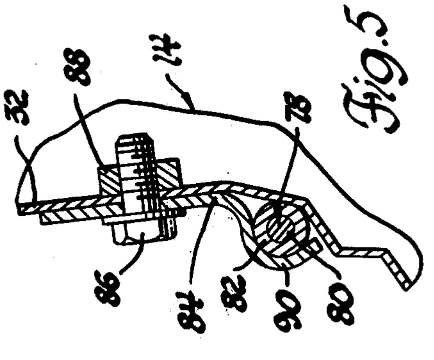
FIG. 5 is a fragmentary and enlarged sectioned view of one end of the torsion rod taken along section line 5—5 in FIG. 4 and looking in the direction of the arrows.

Movement of the gate 14 between closed and open positions is facilitated and aided by the action of an elongated torsion rod type spring 78. Spring 78 is attached to the interior wall 32 of the gate portion 14 as shown in FIG. 4. Specifically, the torsion spring 78 has an elongated main body portion 80 which extends horizontally along and slightly above the lower wall 70 of the gate portion 14. As can be seen in FIG. 5, the main body portion 80 is covered by a tubular member 82 which permits the body portion 80 to rotate slightly within a protective cover. The main body portion 80 and tubular member 82 are clamped to the inner panel 32 by three clamp-like members 84 located as shown in FIG. 4. The clamp-like members 84 have a flat portion which is attached by screws 86 and nut fasteners 88 to the panel 32. FIG. 5 discloses a typical fastener assembly for clamp 84 and also reveals an arcuate portion 90 thereof which engages the tubular member 82 in gripping relation which secures the spring but does not inhibit rotative movement of portion 80 therein.

Figure 3:
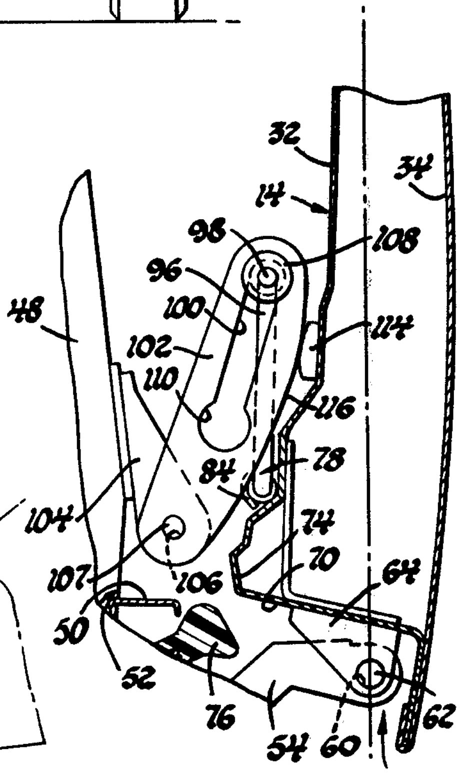
FIG. 3 is a view similar to FIG. 2 but showing the tailgate in a substantially vertical position.
Figure 6:
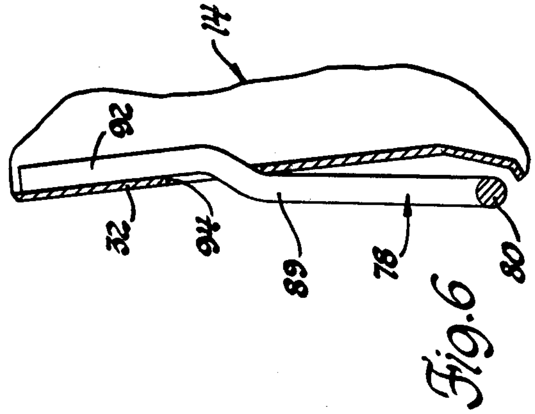
FIG. 6 is a fragmentary and enlarged sectioned view of the torsion rod taken along section line 6—6 in FIG. 4 and looking in the direction of the arrows.

The end 89 of the torsion rod 78 is fixed to panel 32 in the manner shown in FIG. 6. Specifically, the end 89 is bent at a substantially right angle to the main body portion 80 and this includes an offset upper end portion 92 which extends through an opening 94 within panel 32 for retention purposes. This maintains the end 89 of spring 78 in a fixed relationship to the main body portion 80. The opposite end 96 of the torsion rod 78 is also formed to a right angle relation to the body portion 80 and acts as a crank portion 96 shown in FIG. 4. The extreme end of the crank portion 96 is turned outwardly at 98 and passes through a slotted aperture 100 in a link member or arm 102 as shown in FIGS. 2 and 3. The link arm 102 is pivotally supported by a bracket member 104 which is attached to the vehicle. Bracket 104 has a generally horizontally disposed aperture 106 therein which is coaxial with a similar opening in the lower end of the link arm 102. A fastener 107 extends through the openings to support the link member 102 while permitting it to pivot as shown in FIGS. 2, 3.

The end 98 of the crank arm 96 extends through the slotted aperture or opening 100. Specifically, a ferrule member 108 is interposed therebetween. The ferrule 108 may be of a plastic material and, as shown in FIG. 4, is cylindrical with a generally spool like configuration to guide the offset portion 98 in movement within the slotted aperture 100. It is noted that the lower end 110 of the slotted aperture 100 is enlarged to permit the ferrule 108 to be inserted through the opening in link member 102 during assembly of the tailgate. However during opening movement of the tailgate, the offset end 98 does not descend far enough downward within the slotted aperture 100 to be aligned with the enlarged opening 110.

In regard to the aforementioned assembly of the spring 78 to the tailgate 14, and the tailgate 14 to the vehicle, it should be observed that during assembly, the crank arm 96 is pivoted from the unstressed orientation labeled A in FIG. 2 to the orientation labeled B in FIG. 2. Study of FIGS. 2 and 3, which reveal closed, intermediate and open tailgate positions, teaches that the spring 78 is continuously stressed in only one direction (counterclockwise in FIGS. 2 and 3).

When the tailgate 14 is in the fully open position shown by the phantom lines in FIG. 2, the end 98 of crank arm 96 is located at the very top of the slotted aperture 100 and the crank arm 96 is in the B orientation which represents the maximum stressed condition. During closing, the tailgate 14 is lifted upward and pivoted counterclockwise about the axis of pins 62. During closing movement, the crank arm 96 partially unwinds to a more vertical orientation, thus providing a lifting force on the tailgate 14. When the tailgate 14 nears a substantially vertical position as shown in FIG. 3, substantial gravitational forces acting on the tailgate are removed and further lifting forces on the gate are unnecessary. A shoe fulcrum or bearing pad member 114 thereafter engages the outwardly facing and arcuate surface 116 on the member 102. The inwardly facing head of member 114 is curved to provide a smooth engagement portion for the edge surface 116. As the tailgate is further closed by movement from the position of FIG. 3 to the position of FIG. 2 (solid line) the pad member 114 and surface 116 are in sliding contact. Resultantly, from the rearward force on the upper end of arm member 102 by crank arm 96, a reaction force between the arm 102 and pad member 114 is developed tending to force the tailgate in a clockwise rotative direction or toward the more open position. This aids in opening the tailgate by springing the gate from a closed position toward the open position when actuation of control assembly 36 releases the latches 44, 46.

Although only one embodiment of the subject invention has been described in detail and illustrated in the accompanying drawings, modifications are possible which would still be within the scope of the following claims.

What is claimed is as follows:

1. In combination with a vehicle having a tailgate of the type pivotal about the bottom edge, a counterbalance spring assembly for providing an initial closing force assisting an operator in closing the tailgate followed by a kick-out force tending to push open the tailgate, said counterbalance spring assembly comprising: a torque rod with an elongated portion and stationary end portion mounted to said tailgate at a location above the pivotal axis thereof and in a manner permitting torsional winding of the elongated portion in one rotational direction; a second end of said torque rod extending substantially normal to the elongated portion to form a crank arm pivotal about the elongated portion during a winding and unwinding mode of operation; a link arm pivotally attached at one end to the vehicle and having an elongated slotted opening therein between said one end and another end; the second end of said torque rod defining a crank arm and engagement portion extending radially from the elongated portion and through said slotted opening capable of pivotal and sliding movement therein as the tailgate pivots between open and closed positions; said link arm pivoting toward both the vehicle and the tailgate as the tailgate rotates toward the vehicle during a closing mode; contact bearing means on said tailgate to engage the link arm as the tailgate is pivoted to a substantially vertical orientation during the closing mode resultantly providing a fulcrum between the link arm's mounting and the position of its engagement with said torque rod which effectively exerts an opening force on the tailgate.

2. In combination with a vehicle tailgate of the type hinged along its bottom edge to the vehicle body permitting opening movement to a substantially horizontal orientation and closing movement to a position against the vehicle body after passing through an arc of substantially more than about 90 degrees, a counterbalance spring assembly comprising: an elongated torque rod extending adjacent the bottom edge of the tailgate substantially parallel to the hinging axis thereof, one end portion of the torque rod being affixed to the tailgate to prevent rotative movement therebetween, the intermediate portion of the torque rod being secured to the tailgate in a manner permitting torsional rotation of the torque rod but preventing substantial bodily shifting movement thereof, the other end portion of the torque rod being formed into a configuration defining a crank arm with an engagement portion radially spaced from the axis of the torque rod, a link arm member pivotally attached to the vehicle body for movement thereof about an axis substantially parallel to the hinging axis of the tailgate, said link member having an elongated slotted opening therein, means connecting the engagement portion of the crank arm with the link arm member providing for sliding movement therebetween within said slotted opening, the torque rod being torsionally stressed in only one direction and progressively unwinding to a less stressed condition without going through an unstressed condition as the tailgate is moved to a closed position, whereby for a first portion of the closing movement, the torque rod spring imposes a closing force on the tailgate until the tailgate assumes a substantially vertical over-center orientation, said link member pivoting toward the interior walled surface of the tailgate as the tailgate moves into the aforesaid vertical orientation, contact means located on the interior walled surface of the tailgate and engaged by said link member as the tailgate reaches the substantially vertical orientation, thereafter providing a bearing fulcrum located between the pivotal attachment of the link member and the engagement location of the crank arm and the link member thereby providing a reversal of the resultant force on the tailgate during a second portion of closing movement and also during the initial opening movement of the tailgate resulting in an opening force on the tailgate.

3. In combination with a vehicle tailgate of the type hinged along its bottom edge to the vehicle body, permitting opening movement to a substantially horizontal orientation and closing movement to a position against the vehicle body after passing through an arc of substantially more than about 90 degrees, a counterbalance spring assembly comprising: an elongated torque rod extending adjacent the bottom edge of the tailgate substantially parallel to the hinging axis thereof, one end portion of the torque rod being affixed to the tailgate to prevent rotative movement therebetween, the intermediate portion of the torque rod being secured to the tailgate in a manner permitting torsional rotation of the torque rod but preventing substantial body shifting movement thereof, the other end portion of the torque rod being formed into a configuration defining a crank arm with an engagement portion radially spaced from the axis of the torque rod, a link arm member pivotally attached to the vehicle body for movement thereof about an axis substantially parallel to the hinging axis of the tailgate, said link member having an elongated slotted opening therein, means connecting the crank arm engagement portion of the torque rod with the link arm member providing for sliding movement therebetween within the slotted opening, the torque rod being torsionally stressed in only one direction and progressively unwinding to a less stressed condition without going through an unstressed condition as the tailgate is moved to a closed position, whereby for a first portion of closing movement, the torque rod spring imposes a closing force on the tailgate until the tailgate assumes a substantially vertical over-center orientation, said link member pivoting toward the interior walled surface of the tailgate as the tailgate moves into the aforesaid vertical orientation, contact means located on the interior walled surface of the tailgate and engaged by said link member as the tailgate reaches the substantially vertical orientation, thereafter providing a bearing fulcrum between the link's attachment portion and the portion engaged by said crank arm, resulting in an outward opening force on the tailgate, said engagement between the fulcrum forming contact means and the link slidably shifting downward as the tailgate is moved into its fully closed position, whereby the bearing contact between the link and the tailgate results in a progressively larger outward opening force on the tailgate.

* * * * *

UNITED STATES PATENT AND TRADEMARK OFFICE
CERTIFICATE OF CORRECTION

PATENT NO. : 4,143,904
DATED : March 13, 1979
INVENTOR(S) : Norman F. Cooper & David N. Lee It is certified that error appears in the above-identified patent and that said Letters Patent are hereby corrected as shown below:

Column 2, line 67, "bumber" should read --bumper --.

Column 3, line 33, "to" (first occurrence) should read -- at --.

Signed and Sealed this

*Eleventh* Day of *September 1979*

[SEAL]

*Attest:*

LUTRELLE F. PARKER

*Attesting Officer* *Acting Commissioner of Patents and Trademarks*